Patented July 2, 1935

2,006,456

UNITED STATES PATENT OFFICE 2,006,456

MANUFACTURE OF INSECTICIDES AND FUNGICIDES

Joseph Hidy James, Pittsburgh, Pa., assignor to Clarence P. Byrnes, Sewickley, Pa., as trustee No Drawing. Application March 12, 1930, Serial No. 435,374

3 Claims. (Cl. 167—22)

In modern methods of refining a number of petroleum products, it is customary to treat a petroleum fraction, such as gasoline resulting from a cracking operation, with sulphuric acid or with concentrated sulphuric acid or oleum (fuming sulphuric acid) or with concentrated sulphuric acid and oleum. Such treatment is for the purpose of removing certain hydrocarbons and derivatives, such as olefins, asphalt-like bodies, oxygenated bodies and organic bases which react with mineral acid. Aromatic compounds may or may not be removed, but in the present practice of treating gasolines and kerosenes, the conditions are adjusted to leave these in the product.

When the separation is made after such acid treatment, "sludge" is produced, which has been very difficult to treat or handle for any industrial purpose. I have found that such sludge material can be cheaply treated for the production of insecticide and fungicide compounds. In the acid treatment, and especially if fuming acid is used, there is an oxidizing action involved, especially in reaction between the acid and the more reactive hydrocarbons. These oxygenated bodies, in turn, react with other portions of the acid to form sulphonates or sulphates, in addition to polymerization. The reaction between the olefins and sulphuric acid acts to form alkyl sulphates which, on hydrolysis, form alcohols.

In treating such sludge acids or sludge materials for forming insecticides or fungicides, I preferably employ the following steps in order to obtain a product which will emulsify readily and be suitable for such purposes:

1. The addition, repeated as often as necessary, of a saturated or nearly saturated solution of alkali sulphate, such as sodium sulphate, salt or any water soluble sulphate. This step serves to remove the free sulphuric and sulphurous acid, etc., resulting from the sulphuric acid treatment on the fraction being purified.

2. Agitating the resulting mass with a sufficient excess of caustic soda or potassium hydroxide to cause an alkaline condition in the water in contact with the oily or pasty mass, a caustic soda solution of approximately 15% being suitable. Thus I keep the soaps that are formed in the "salted out" condition and prevent their appreciable solution in this step. The caustic liquid is then drawn off.

3. I then wash the oily or pasty mass repeatedly with a saturated or nearly saturated salt solution (ordinary sodium chloride in water) until the excess alkali from the second step is removed. Then I preferably wash the oily or pasty mass with very small amounts of cold water to remove the salt solution. This results in the loss of a small amount of the soaps and water emulsifiable components of the product.

The general result from the foregoing treatments is that the resulting mass contains alcohols from the hydrolysis of the sulphates, soaps from the saponification of any organic acid present in the sludge, and possibly sodium sulphonates (which are water soluble) resulting from any aromatic hydrocarbons acted upon or from certain oxidized bodies amenable to sulphonation.

Then I preferably mix with the oily or pasty product, preferably by agitation and heat, small percentages of well known insect poison, such as nicotine, derris root or other organic poisons, or inorganic poisons, such as copper and arsenic derivatives. Thus prepared, the preparation is emulsifiable and may be stirred into water to form an emulsion which may be readily sprayed or spread upon foliage, etc.

The advantages of my invention result from the utilizing of a substantially waste product or byproduct, thus giving cheap production of a medium which is toxic in itself and also has a spreading and sticking tendency on the foliage to effectively spread the insect poison added thereto.

Changes may be made in the steps employed without departing from my invention.

I claim:

1. In the process of treating sulphonated products obtained by treating lighter petroleum fractions such as gasoline with sulphuric acid to obtain an emulsifiable insecticide or fungicide, the steps consisting of neutralizing the sulphuric and sulphurous acids present by adding a strong solution of a water-soluble alkali capable of said neutralization, removing the neutralized acid, then agitating the remaining mass with a weaker alkaline water solution, decanting and removing the water solution, then washing the remainder to remove excess alkali, and then adding a small percentage of an insect poison.

2. In the process of treating sulphonated products obtained by treating lighter petroleum fractions such as gasoline with sulphuric acid to obtain an emulsifiable insecticide or fungicide, the steps consisting of neutralizing the sulphuric and sulphurous acids present by adding a strong solution of a water-soluble sulphate capable of said neutralization, removing the neutralized acid, then agitating the remainder with a weaker alkaline water solution, removing the water solution, then washing the remainder to remove excess alkali, and then adding a small percentage of an organic insect poison.

3. In the process of treating sulphonated products obtained by treating lighter petroleum fractions such as gasoline with sulphuric acid to obtain an emulsifiable insecticide or fungicide, the steps consisting of neutralizing the free acids, hydrolyzing the sulphates, washing and removing excess alkali and then adding a small percentage of an insect poison.

JOSEPH HIDY JAMES.